(12) United States Patent
Mimura (10) Patent No.: US 8,306,694 B2
(45) Date of Patent: Nov. 6, 2012

(54) ACTIVATION AND DISPLAY OPERATION OF A NAVIGATION APPARATUS IN RESPONSE TO DETECTION OF TRIGGER EVENT AND DOOR OPENING

(75) Inventor: Yoshitaka Mimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 367 days.

(21) Appl. No.: 12/720,324

(22) Filed: Mar. 9, 2010

(65) Prior Publication Data

US 2010/0235087 A1  Sep. 16, 2010

(30) Foreign Application Priority Data

Mar. 10, 2009 (JP) .................... 2009-056699

(51) Int. Cl.
G01C 21/30 (2006.01)
(52) U.S. Cl. ............. 701/36; 701/49; 701/400; 701/431
(58) Field of Classification Search .................. None
See application file for complete search history.

(56) References Cited

U.S. PATENT DOCUMENTS

| 6,052,646 | A * | 4/2000 | Kirkhart et al. | 701/490 |
| 6,055,479 | A * | 4/2000 | Kirkhart et al. | 701/490 |
| 6,059,843 | A * | 5/2000 | Kirkhart | 701/490 |
| 6,282,495 | B1 * | 8/2001 | Kirkhart et al. | 701/490 |
| 7,343,234 | B2 * | 3/2008 | Kameyama | 701/36 |
| 7,515,133 | B2 * | 4/2009 | Usami | 345/99 |
| 7,683,771 | B1 * | 3/2010 | Loeb | 340/461 |
| 2004/0100148 | A1 * | 5/2004 | Kindo et al. | 307/66 |
| 2007/0159313 | A1 | 7/2007 | Tamura | |
| 2008/0275632 | A1 * | 11/2008 | Cummings | 701/200 |
| 2009/0135062 | A1 * | 5/2009 | Hori | 342/357.15 |
| 2011/0022264 | A1 | 1/2011 | Conan et al. | |

FOREIGN PATENT DOCUMENTS

| CN | 1906060 A | | 1/2007 |
| JP | 1020414 | * | 1/1989 |
| JP | 2186385 | * | 7/1990 |
| JP | 07-134041 | | 5/1995 |
| JP | 10-217865 | | 8/1998 |
| JP | 11-295080 | | 10/1999 |
| JP | 2001-165676 | | 6/2001 |
| JP | 2004-231020 | | 8/2004 |
| JP | 2005-189060 | | 7/2005 |
| JP | 2006-098288 | | 4/2006 |
| JP | 2008179212 | * | 8/2008 |
| WO | 2009024711 A1 | | 2/2009 |

* cited by examiner

Primary Examiner — Richard M. Camby
(74) Attorney, Agent, or Firm — Rankin, Hill & Clark LLP (57) ABSTRACT

In a navigation apparatus having a navigator installed on a vehicle and calculating a routing path from a detected current location to a designated destination and a display connected to the navigator to display the calculated routing path on a map, an event such as door unlocking that happens before starting of the vehicle is detected as a trigger, opening of a door of the vehicle is detected, and the navigator is activated when the trigger is detected to operate the display to show an indication that activation of the navigator is started on the display when the opening of the vehicle door is detected. With this, it becomes possible to activate the navigator early and readily enables the user to check or recognize the activation condition of the navigator.

12 Claims, 6 Drawing Sheets

ACTIVATION AND DISPLAY OPERATION OF A NAVIGATION APPARATUS IN RESPONSE TO DETECTION OF TRIGGER EVENT AND DOOR OPENING

BACKGROUND OF THE INVENTION

1. Field of the Invention

This invention relates to a navigation apparatus.

2. Description of the Related Art

In a navigation apparatus equipped with at least a navigator that calculates a routing path from the current location of the vehicle to a designated destination and a display that displays the calculated routing path on a map, since activation of both of hardware and software is required for activating the navigator and it takes time so that it may frustrate the user or passenger.

Japanese Laid-Open Patent Application No. 2005-189060 teaches a technique to activate a navigator using an event such as unlocking or opening of a door of the vehicle or the like as a trigger, and immediately start displaying when the user turns on the engine key switch.

SUMMARY OF THE INVENTION

However, the prior art is disadvantageous in that the user can not check or confirm the activation of the navigator before he/she turns on the engine key switch.

The object of this invention is therefore to overcome the aforesaid drawback by providing a navigation apparatus that can activate a navigator early and readily enables the user to check or recognize the activation condition of the navigator.

In order to achieve the object, this invention provides in its first aspect a navigation apparatus, comprising: a navigator that is adapted to be installed on a vehicle, the navigator detecting a current location of the vehicle and calculating a routing path from the current location to a designated destination; a display connected to the navigator to display the calculated routing path on a map, a trigger detector that detects an event that happens before starting of the vehicle as a trigger; a door open detector that detects opening of a door of the vehicle; and an activator that activates the navigator when the trigger is detected and operates the display to show an indication that activation of the navigator is started on the display when the opening of the vehicle door is detected.

In order to achieve the object, this invention provides in its second aspect a method of operating a navigation apparatus having a navigator that is adapted to be installed on a vehicle, the navigator detecting a current location of the vehicle and calculating a routing path from the current location to a designated destination, and a display connected to the navigator to display the calculated routing path on a map, comprising the steps of: detecting an event that happens before starting of the vehicle as a trigger; detecting opening of a door of the vehicle; and activating the navigator when the trigger is detected and operating the display to show an indication that activation of the navigator is started on the display when the opening of the vehicle door is detected.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment for implementing a navigation apparatus according to this invention is explained in the following with reference to the attached drawings.

Figure 1:
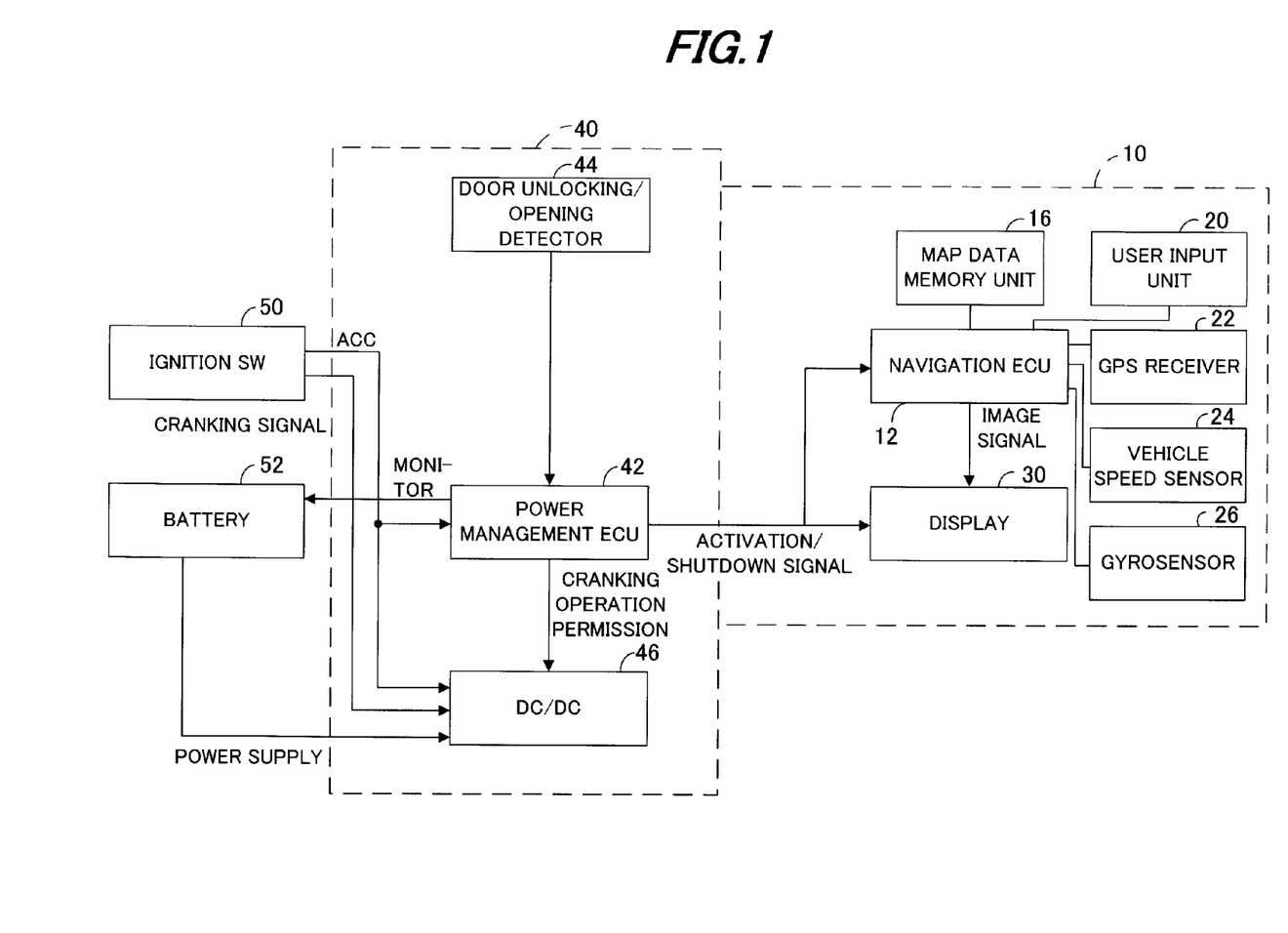
FIG. 1 is a schematic diagram showing the overall configuration of a navigation apparatus according to an embodiment of this invention.

FIG. 1 is a schematic diagram showing the overall configuration of the navigation apparatus according to an embodiment of this invention.

In FIG. 1, reference numeral 10 designates the navigation apparatus. The apparatus 10 is mounted on a vehicle (not shown) powered by an internal combustion engine (not shown) and installed in a dashboard of the vehicle.

The apparatus 10 comprises a navigation ECU (electronic control unit for navigation) 12, a map data memory unit 16, a user input unit 20, a GPS receiver 22 for receiving GPS (Global Positioning System) signals, a vehicle speed sensor 24 that produces an output or signal proportional to the traveling speed (vehicle speed) of the vehicle, a gyrosensor 26 that produces an output or signal proportional to the rotational angular velocity (yaw rate) about the center axis of the vehicle, and a display 30.

The navigation ECU 12, which comprises a microcomputer having a CPU, ROM, RAM, I/O ports and other components, detects the current location of the vehicle in accordance with a stored program based on a GPS signal received by the GPS receiver 22 and outputs of the vehicle speed sensor 24 and gyrosensor 26, calculates a routing path from the detected current location to a destination (or via point) that is designated by an input operation of the user (driver) through the user input unit 20, and sends the calculated routing path together with map data stored in the map data memory unit 16 as image signals to the display 30 connected to the navigation ECU 12. The display 30 shows the received routing path on the map based on the image signals sent from the navigation ECU 12.

The map data memory unit 16, which comprises a hard disk (HDD), DVD-ROM, CD-ROM and other components, stores map data, map matching data, data of buildings, names of places, etc., and the like. The navigation ECU 12 inputs the map data stored in the map data memory unit 16 and sends it together with the calculated routing path to the display 30.

In this embodiment, the apparatus 10 is equipped with a power management unit 40. Power management is needed because activation of the apparatus 10 takes place at the same time with activation of the engine. The power management unit 40 functions as a trigger detector, door open detector and activation displayer.

The power management unit 40 will be explained with reference to FIG. 1. The power management unit 40 is equipped with a power management ECU (electronic control unit for power management) 42, door unlocking/opening detector 44 and DC/DC converter 46, and connected to an ignition switch (SW) 50 of the engine and a battery (power source) 52.

The power management ECU 42, which comprises a microcomputer having a CPU, ROM, RAM, I/O ports and other components similarly to the navigation ECU 42, monitors remaining charge of the battery 52, determines whether the cranking operation is permissible when an ignition key (not shown) is put or inserted into the ignition switch 50 and turned over the energized position (ACC (accessory) position) to the ignition position (IG (ignition) position) by the user so that a cranking signal is produced, and when it is permissible, sends a cranking permission signal to the DC/DC converter 46 to supply current from the battery 52 to a starter (cell) motor (not shown), thereby activating the engine.

The power management ECU 42 operates in accordance with a program stored in its ROM to supply current to the navigation ECU 12 for activating it when an event that happens temporally before vehicle starting, i.e., the unlocking of a door (door lock) of the vehicle by the user is detected by the door unlocking/opening detector 44 as a trigger, and display an indication that the navigation ECU 12 is being activated on the display 30 upon detecting the opening of a vehicle door.

When the engine is activated simultaneously with the activation of the navigation ECU 12, the power management ECU 42 boosts voltage of power supply, which is the rest of power supply to the starter motor, through the DC/DC converter 46 and supplies it to the apparatus 10.

The door unlocking/opening detector 44 detects displacement of the door lock through key manipulation by the user or through the operation of an electric door opening/closing motor (not shown) that responds a wireless signal transmitted by manipulation of a keyless entry system or the like, and detects the door opening after the door unlocking based on an output of an opening/closing switch (not shown) disposed near the door.

Figure 2:
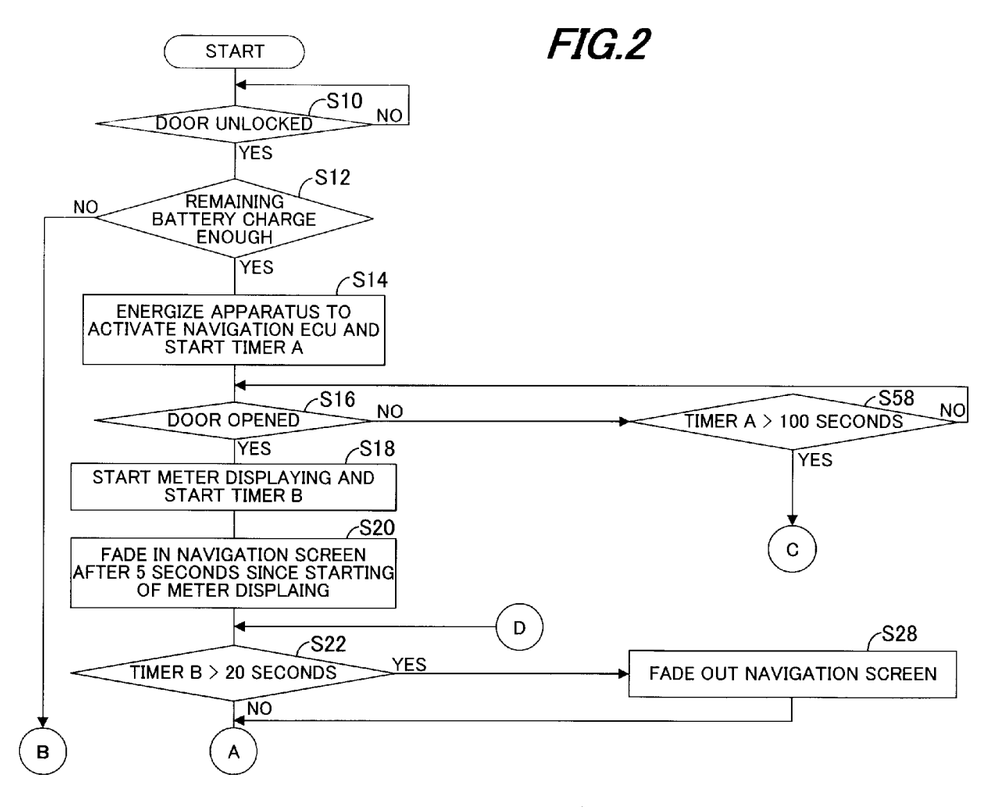
FIG. 2 is a former half of a flowchart showing the operation of the apparatus shown in FIG. 1, precisely an ECU of a power management unit thereof.
Figure 3:
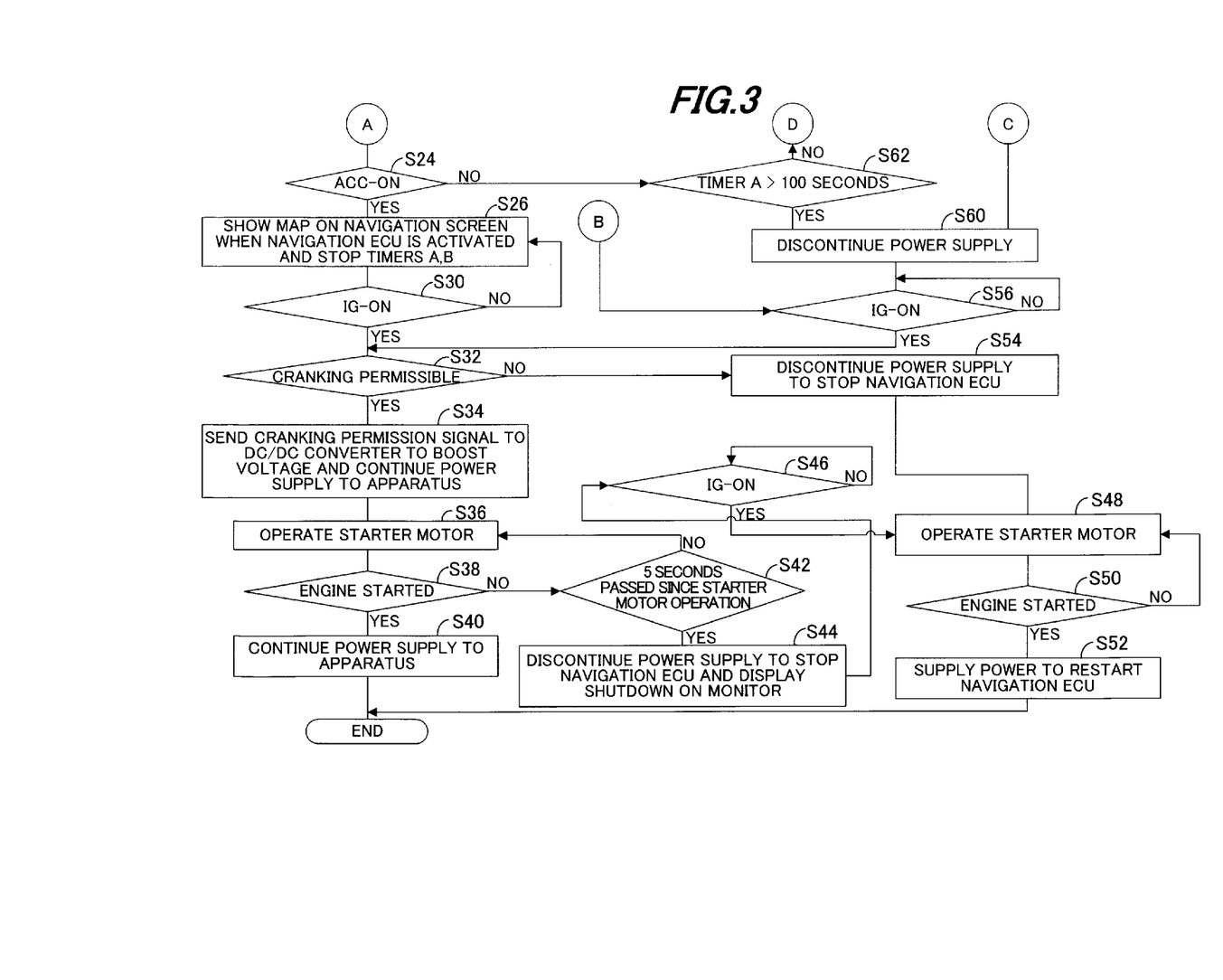
FIG. 3 is a latter half of the flowchart of FIG. 2.

FIG. 2 is a former half of a flowchart showing the operation of the apparatus 10, precisely the power management ECU 42 of the power management unit 40, and FIG. 3 is a latter half thereof.

The program starts in S10 in which it is determined whether the door has been unlocked, i.e., the user has unlocked the door (door lock) of the vehicle. The processing is continued until the result becomes affirmative and when it does, the program proceeds to S12 in which it is determined whether the battery 52 charge remains enough, specifically, the remaining charge is enough for activating the apparatus 10 and for starting the engine.

When the result in S12 is affirmative, the program proceeds to S14 in which the apparatus 10 is energized to activate the navigation ECU 12, etc. Specifically, the navigation ECU 12 is energized to start its operation and initialize a memory area such as the RAM of the navigation ECU 12. At the same time, a timer A (up counter) is started to begin time measurement.

The program next proceeds to S16 in which it is determined whether the vehicle door is opened and when the result is affirmative, to S18 in which meter displaying is started and a timer B (down counter) is started to begin time measurement.

Figure 4A:
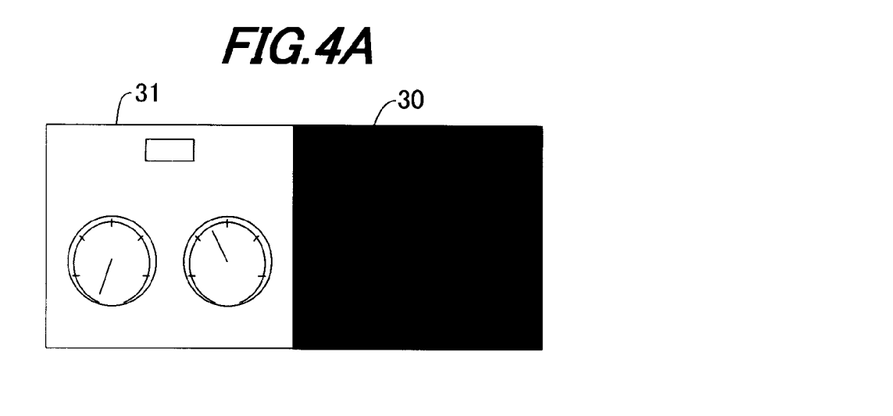
FIG. 4 is a set of explanatory views of screen patterns of a display for explaining the processing in FIGS. 2 and 3.
Figure 4B:
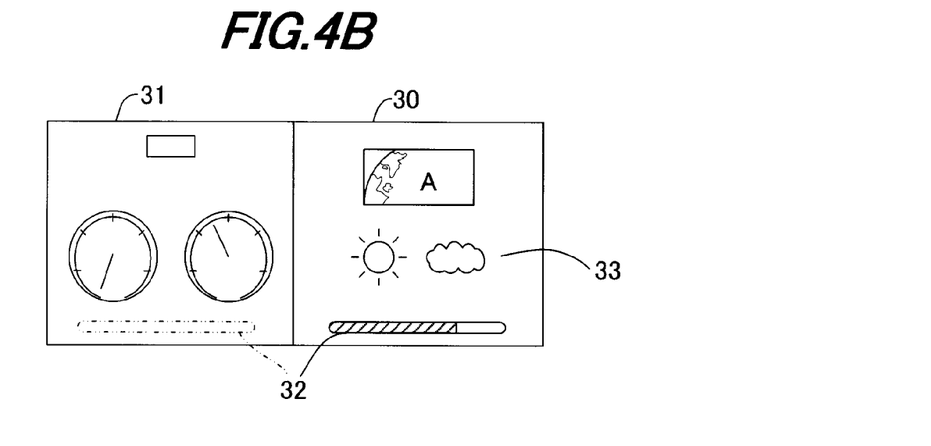

FIGS. 4A to 4B are a set of front views showing several patterns on the display 30 and a meter display 31, both installed near the dashboard in front of driver's seat of the vehicle on which the apparatus 10 is mounted. As illustrated, the display 30 shows an indication indicative of operation of the apparatus 10 (this is hereinafter called the "navigation screen"). The meter display 31 displays or shows electronic meters including a speed meter, tachometer, etc., checked by the user to drive the vehicle.

The explanation of FIG. 2 is resumed. In S18, as shown in FIG. 4A, the meter displaying on the meter display 31 is started and program proceeds to S20 in which the navigation screen on the display 30 is faded in after 5 seconds since the start of the meter displaying based on the value of the timer B.

The time period of 5 seconds since the start of the meter displaying is determined taking into account a preparation time necessary for the apparatus 10 to start displaying on the navigation screen or necessary for the vehicle user to open the door and sit on the seat.

Specifically, as shown in FIG. 4B, the navigation screen on the display 30 is faded in at low brightness. At this time, a status bar 32 is shown at the bottom of the navigation screen to indicate the progress of activation (activation condition) of the navigator by the navigation ECU 12 with time.

The status bar may be shown on the meter display 31, as indicated by imaginary line in FIG. 4B. Also, instead of (or in addition to) the status bar, information 33 such as weather forecast of surrounding area, traffic information, stock information, etc., designated by the user in advance can be shown.

To be specific, the apparatus 10 can be configured to be connectable to the Internet so that the information 33, which is appropriately designated by the user as needed, is updated on a real-time basis for showing the latest information. Further, an anniversary, a return date of a rental DVD, etc., can be displayed for calling the user's attention.

Returning to the explanation of FIG. 2, the program proceeds to S22 in which it is determined whether the value of the timer B has exceeded 20 seconds, i.e., 20 seconds have passed since the meter display was started, and when the result is negative, to S24 (in FIG. 3) in which it is determined whether it is ACC-ON, i.e., the ignition key is turned by the user to the energized position (ACC) of the ignition switch 50, in other words, the starting operation of the vehicle was carried on.

The value of the timer B is set to 20 seconds here for presuming the case where, despite boarding the vehicle, the user does not intend to drive or use navigation, apparatus 10, etc.

When the result in S24 is affirmative, the program proceeds to S26 in which a map is shown on the navigation screen on the display 30 when the activation of the navigation ECU 12 has been completed, and the timers A, B are stopped.

Figure 5A:
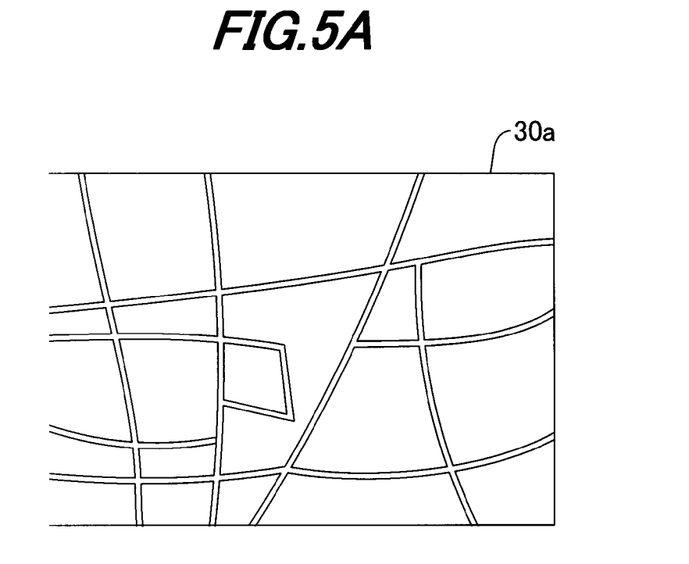
FIG. 5 is a set of explanatory views similarly showing screen patterns of the display for explaining the processing in FIGS. 2 and 3.

FIG. 5A is an explanatory view of the navigation screen on the display 30 under that situation. When the activation of the navigation ECU 12 has not been completed, an indication to that effect (such as "activating") is indicated in S26.

Figure 4C:
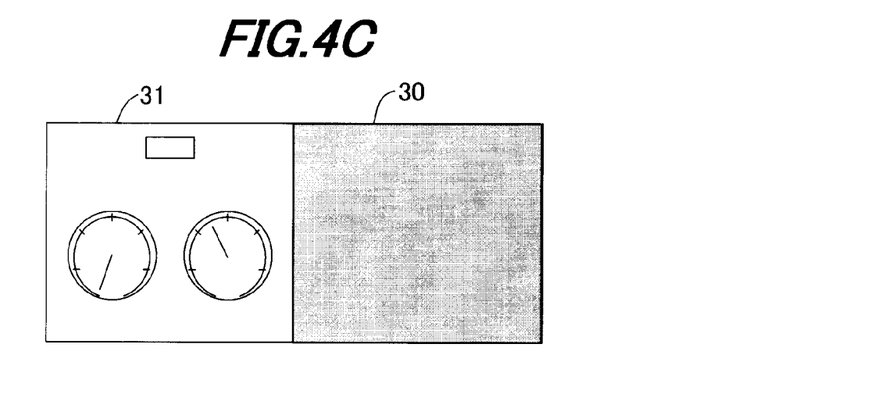

When the result in S22 is affirmative, i.e., it is determined that 20 seconds have passed since the meter display starting, the program proceeds to S28 in which, as shown in FIG. 4C, the navigation screen on the display 30 is faded out (make darker) and enters power saving mode to reduce power consumption.

Specifically, when it does not become ACC-ON after 20 seconds has passed since the door opening, it can be judged that the user opened the door to pick up something left behind or the like, but does not intend to start the vehicle. Accordingly, the navigation screen on the display 30 is faded out.

The program proceeds to S30 in which it is determined whether it is IG-ON, i.e., the ignition key is turned by the user to the ignition position (IG) of the ignition switch 50 to produce the cranking signal, and when the result is affirmative, to S32 in which it is determined whether the cranking operation is permissible.

When the result in S32 is affirmative, the program proceeds to S34 in which the cranking permission signal is sent to the DC/DC converter 46 to boost voltage and continuously supply power to the apparatus 10 and to S36 in which the starter motor is supplied with power to be operated.

The program next proceeds to S38 in which it is determined whether the engine is started, i.e., the engine speed has reached a self-rotational speed, based on the outputs of the crank angle sensor (not shown), etc. When the result is affirmative, the program proceeds to S40 in which power is continuously supplied to the apparatus 10 to conduct the normal operation, precisely, the aforementioned operation of the navigation ECU 12.

Figure 5B:
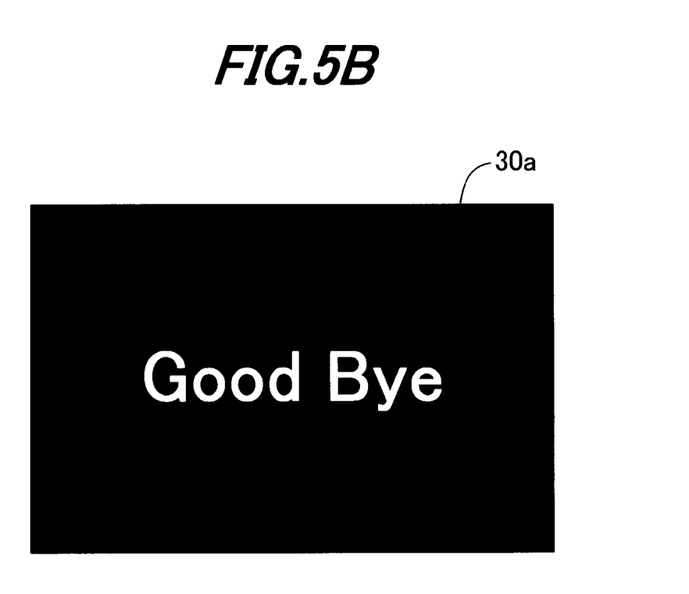

On the other hand, when the result in S38 is negative, the program proceeds to S42 in which it is determined 5 seconds have passed after the starter motor operation was started. When the result is negative, the program proceed to S36, while when result is affirmative, the program proceed to S44 in which power supply to the apparatus 10 is discontinued to stop (shut down) the operation of the navigation ECU 12 and a notice indicating the shut-down is displayed on the navigation display 30. FIG. 5B is an explanatory view of the navigation screen on the display 30 at the moment.

The program then proceeds to S46 in which it is determined whether it is IG-ON. When the result is affirmative, the program proceeds to S48 in which the starter motor is operated, and to S50 in which it is determined whether the engine has been started. When the result in S50 is affirmative, the program proceeds to S52 in which the apparatus 10 is supplied with power to restart the navigation ECU 12.

When the result in S32 is negative, i.e., when it is determined that the cranking operation is not permissible, since it means insufficiency of voltage, the program proceeds to S54 in which power supply to the apparatus 10 is discontinued and then proceeds to S48.

When the result in S12 is negative, i.e., when it is determined that the remaining charge of the battery 52 is not enough, the program proceeds to S56 in which it is determined whether it is IG-ON and when the result is affirmative, proceeds to S32. Specifically, when the remaining charge of the battery 52 is determined to be insufficient, only the engine start operation is conducted.

When the result in S16 is negative, i.e., when it is determined that the vehicle door is not opened, the program proceeds to S58 (in FIG. 2) in which it is determined whether the value of the timer B, which measures the elapsed time since activation of the navigation ECU 12, has exceeded 100 seconds (1 minute and 40 seconds), i.e., 100 seconds have passed after the navigation ECU 12 was the activated. When the result is affirmative, the program proceeds to S60 in which power supply to the apparatus 10 is discontinued and the notice of shut-down is displayed.

Similarly, when the result in S24 is negative, i.e., when it is determined that it does not become ACC-ON, the program proceeds to S62 in which it is determined whether 100 seconds have passed after the navigation ECU 12 was activated, and when the result is affirmative, proceeds to S60. The setting of 100 seconds is to determine whether the user intends to start the vehicle or not.

To be specific, when it does not become ACC-ON after 100 seconds have passed since door unlocking, it can be judged that the user has no intention to start the vehicle at all, so that power supply to the apparatus 10 is discontinued to shut down the navigation ECU 12 since continuous power supply thereto would adversely affect starting of the engine or the like.

Figure 6:
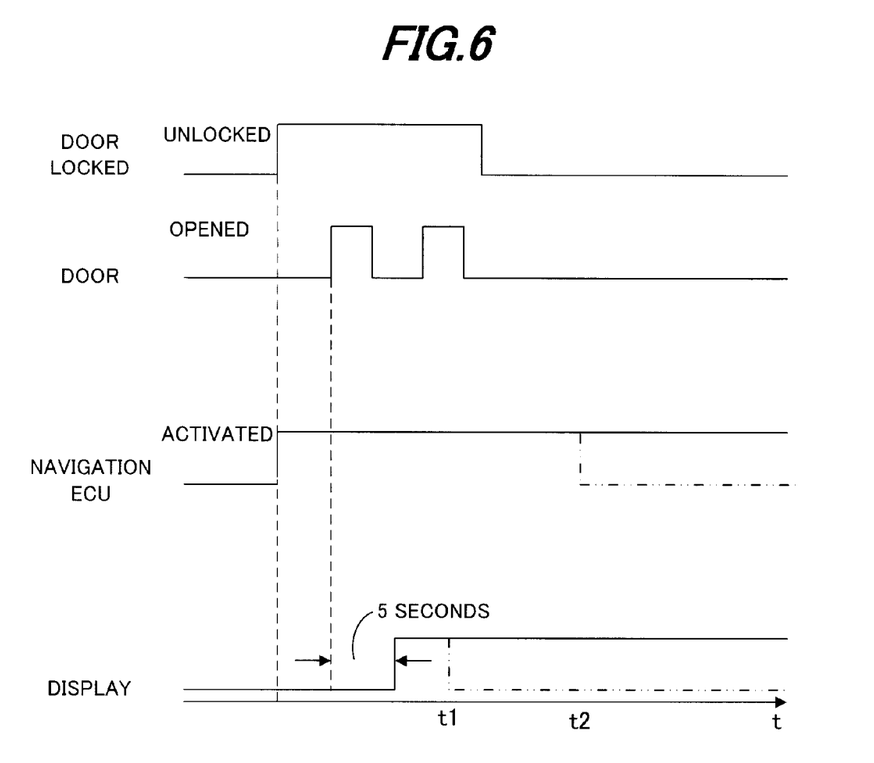
FIG. 6 is a time chart for explaining the processing in FIGS. 2 and 3.

FIG. 6 is a time chart explaining the processing in FIGS. 2 and 3.

As illustrated, in this embodiment, when the door of the vehicle is unlocked, the apparatus 10 is supplied with power to activate the navigation ECU 12. Upon opening the door, the meter display is started.

When 5 seconds have passed after that, the navigation screen on the display 30 is faded in at low brightness and the status bar 32 indicates the progress of activation (activation condition) of the navigation ECU 12 with respect to time.

When the ACC-ON operation is not conducted within 20 seconds since the displaying of the activation of the navigation ECU 12, the navigation screen, i.e., the display is faded out at the time point t1 so as to prevent a waste of battery 52.

When the door is not opened or ACC-ON operation of the ignition switch 50 is not conducted after 100 seconds have passed since the activation of the navigation ECU 12, the activation is stopped at, for example, at the time point t2 to prevent a waste of battery 52.

As stated above, the embodiment is configured to have a navigation apparatus (10) and a method of operating the same, comprising: a navigator (navigation ECU) 12 that is adapted to be installed on a vehicle, the navigator detecting a current location of the vehicle and calculating a routing path from the current location to a designated destination; a display (30) connected to the navigator to display the calculated routing path on a map, a trigger detector (door unlocking/opening detector 44, power management ECU 42, S10) that detects an event that happens before starting of the vehicle as a trigger; a door open detector (door unlocking/opening detector 44, power management ECU 42, S16) that detects opening of a door of the vehicle; and an activator (power management ECU 42, S10, S14, S16, S18, S20) that activates the navigator when the trigger is detected and operates the display to show an indication that activation of the navigator is started on the display when the opening of the vehicle door is detected.

With this, it becomes possible to activate the navigation ECU 12 early and the user can check or recognize the progress of activation (activation condition) of the navigation ECU 12 before putting the ignition key into the ignition switch 50 and manipulate it, i.e., conducting the vehicle start operation.

In other words, since it generally takes quite long time until the activation of the navigation ECU 12 is completed, the user may sometimes be frustrated. In this embodiment, however, the activation of the navigation ECU 12 can be completed earlier since the activation operation is started before the user conducts the vehicle start operation and the user can visibly confirm the activation through the display, thereby enabling to avoid experiencing frustration more surely.

In the apparatus and method, the activator operates the display (30), more specifically the navigation screen to fade out the indication when the starting of the vehicle is not conducted before a predetermined condition is established after the activation of the navigator is displayed (S22-S28), specifically, the predetermined condition is that the starting of the vehicle is conducted before a predetermined time period has passed, more specifically the ACC-ON operation is not conducted before 20 seconds have passed after the activation of the navigator is displayed. Since showing on the navigation screen is not continued for an unnecessarily long time, in addition to the foregoing effects, a waste of battery 52 can be prevented.

In the apparatus and method, activator operates the displays to indicate progress of the activation of the navigator with respect to time. With this, the user can more readily check or recognize the progress of activation (activation condition) of the navigation ECU 12.

In the apparatus and method, the activator operates the display 30 to show information designated by a user in advance. With this, in addition to the foregoing effects, the user can obtain necessary information before driving the vehicle, thereby improving convenience for the user.

In the apparatus and method, the event to be detected as a trigger is unlocking of the vehicle door. With this, in addition to the foregoing effects, it becomes possible to surely detect the event as a trigger.

It should be noted that, in the foregoing, although unlocking of the door is explained as the event as a trigger before vehicle starting (ignition switch-on), any other event such as completion of ID authentication of the keyless entry system can be used as a trigger as long as it takes place prior to the vehicle starting, vehicle door opening, or the like.

Japanese Patent Application No. 2009-056699 filed on Mar. 10, 2009, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A navigation apparatus, comprising:
a navigator that is adapted to be installed on a vehicle, the navigator detecting a current location of the vehicle and calculating a routing path from the current location to a designated destination;
a display connected to the navigator to display the calculated routing path on a map, a trigger detector that detects an event that happens before starting of the vehicle as a trigger;
a door open detector that detects opening of a door of the vehicle; and
an activator that is operable to activate the navigator and the display independent of one another, wherein the activator activates the navigator when the trigger is detected and, after said navigator is activated, said activator activates the display when opening of the vehicle door is detected so as to show an indication that activation of the navigator is started on the display.

2. The apparatus according to claim 1, wherein the activator de-activates the display to fade out the navigator indication when the starting of the vehicle is not conducted before a predetermined condition is established after the display is activated.

3. The apparatus according to claim 2, wherein the predetermined condition is the starting of the vehicle before a predetermined time period has passed after the activation of the display.

4. The apparatus according to claim 1, wherein the activator operates the display to indicate progress of the activation of the navigator with respect to time.

5. The apparatus according to claim 1, wherein the activator operates the display to show information designated by a user in advance.

6. The apparatus according to claim 1, wherein the event to be detected as the trigger is unlocking of the vehicle door.

7. A method of operating a navigation apparatus having a navigator that is adapted to be installed on a vehicle, the navigator detecting a current location of the vehicle and calculating a routing path from the current location to a designated destination, and a display connected to the navigator to display the calculated routing path on a map, comprising the sequential steps of:
detecting an event that happens before starting of the vehicle as a trigger;
activating the navigator when the trigger is detected;
detecting opening of a door of the vehicle; and
activating the display when opening of the vehicle door is detected to show an indication that activation of the navigator has started.

8. The method according to claim 7, comprising the further step of fading out the display when starting of the vehicle is not conducted before a predetermined condition is established after the activation of the display is activated.

9. The method according to claim 8, wherein the predetermined condition is starting of the vehicle is conducted before a predetermined time period has elapsed after the activation of the display.

10. The method according to claim 7, wherein the display is operable to indicate progress of the activation of the navigator with respect to time.

11. The method according to claim 7, wherein the display is operable to show information designated by a user in advance.

12. The method according to claim 7, wherein the event to be detected as the trigger is unlocking of the vehicle door.

* * * * *